United States Patent [19]

Ohmori et al.

[11] Patent Number: 4,841,516
[45] Date of Patent: Jun. 20, 1989

[54] TURNTABLE FOR MOUNTING RECORDING MEDIUM IN DISK FORM

[75] Inventors: Michio Ohmori; Michiya Okamura; Hiroshi Yui, all of Mie, Japan

[73] Assignee: Mitsubishi Petrochemical Co., Ltd., Tokyo, Japan

[21] Appl. No.: 96,484

[22] Filed: Sep. 15, 1987

[30] Foreign Application Priority Data

Sep. 20, 1986 [JP] Japan .................................. 61-223255
Sep. 25, 1986 [JP] Japan .................................. 61-226516

[51] Int. Cl.$^4$ ................................................ G11B 3/60
[52] U.S. Cl. ...................................... 369/264; 369/271
[58] Field of Search .......................... 369/264, 265, 271

[56] References Cited

U.S. PATENT DOCUMENTS

| | | | |
|---|---|---|---|
| 778,492 | 12/1904 | Johnson | 369/271 |
| 1,480,629 | 1/1924 | Nolen | 369/271 |
| 4,524,109 | 6/1985 | Desai | 369/264 |
| 4,535,438 | 8/1985 | Massarell et al. | 369/264 |

*Primary Examiner*—Steven L. Stephan
*Attorney, Agent, or Firm*—Oblon, Fisher, Spivak, McClelland & Maier

[57] ABSTRACT

A turntable comprising a disk-shaped substrate and a portion for receiving a disk-shaped recording medium is disclosed. The disk-shaped substrate is shaped from a thermoplastic composite resin having a dynamic shear modulus, G′, of at least $1.5 \times 10^{10}$ dyne/cm$^2$, a $G_1'(-40°$ C.$)/G_2'(100°$ C.$)$ ratio of up to 1.5, and a density of up to 2.0 g/cm$^3$, and the receiving portion is formed on the top of the substrate from a thermoplastic elastomer having a hardness of 5 to 40. The turntable has high dimensional precision and will experience reduced warpage. The turntable is capable of being revolved in a stable manner to ensure an increased precision in reading information. In addition, the turntable has a rapid access time and is capable of attaining a steady speed of revolution in a shorter period of time after the power has been switched on.

11 Claims, 2 Drawing Sheets

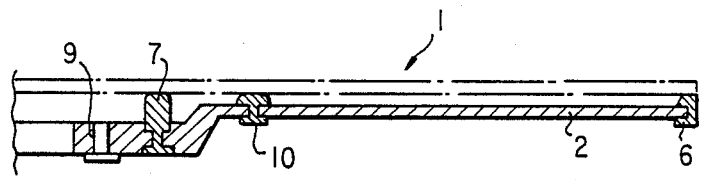
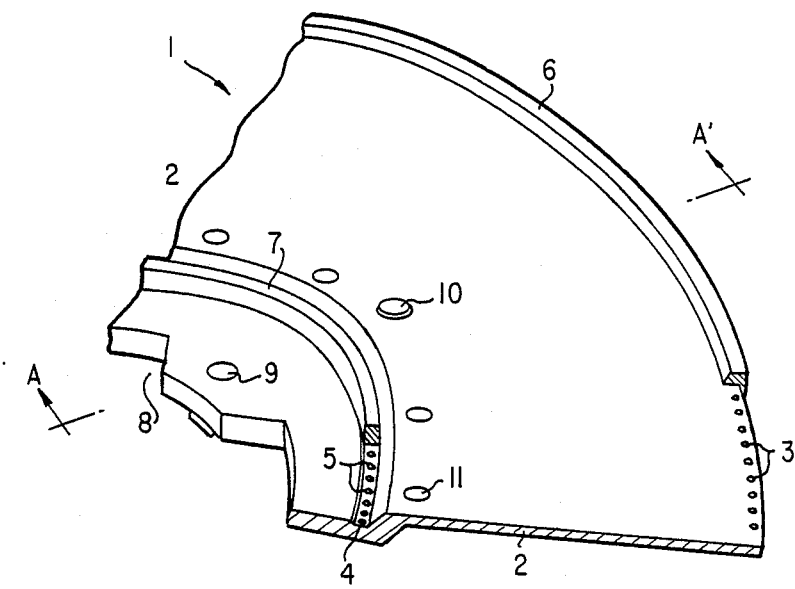

TURNTABLE FOR MOUNTING RECORDING MEDIUM IN DISK FORM

FIELD OF THE INVENTION

The present invention relates to a novel turntable for mounting disks in audio and video apparatus such as video and compact disk players.

BACKGROUND OF THE INVENTION

Turntable in audio and video apparatus are conventionally made of metals such as aluminum or reinforced thermosetting resins such as bulk molding compound. Because of their high dimensional accuracy, turntables made of metals or reinforced thermosetting resins have the advantage that they experience a reduced level of vibration when they are revolving at high speed. On the other hand, such turntables are so heavy that they involve a long access time before a video or audio signal materializes and that they do not have a sufficient ability to damp vibrations exerted upon the apparatus as a whole. It has therefore been desired to develop a turntable having a higher performance.

In response to this need, the present inventors attempted to develop a turntable of higher performance that is made of a shaped article of thermoplastic resin. Compared to thermosetting resins, thermoplastic resins are more easily shaped into products of thin section and hence have the potential to provide turntables of lighter weight. Furthermore, thermoplastic resins can be directly shaped into articles of a complex shape such as those having ribs or holes without requiring any special machining to make them. Because of these features, thermoplastic resins are considered to be suitable for the purpose of making turntables of higher performance. However, none of the prior art thermoplastic resins are suitable for commercial application because if they are shaped into disks with thicknesses of up to 3 mm, warpage will develop in the disks on account of internal strain and the disks do not have any satisfactory dimensional accuracy in thickness terms.

Under the circumstances described above, the present inventors conducted intensive studies to make a turntable of high performance and successfully produced the desired turntable by forming a receiving portion from a specified thermoplastic elastomer on top of a substrate that was shaped from a specified thermoplastic composite resin of higher rigidity under specified forming conditions and which displayed reduced warpage while exhibiting high dimensional accuracy in terms of thickness.

SUMMARY OF THE INVENTION

The present invention provides a turntable for mounting a recording medium in a disk form which comprises a substrate in a disk form and a receiving portion projecting from the top of the substrate, the substrate being shaped from a thermoplastic composite resin that has a dynamic shear modulus, $G'$, of at least $1.5 \times 10^{10}$ dyne/cm$^2$ as measured at a frequency of 11 Hz over the temperature range of $-40°$ C. to $100°$ C., the ratio of $G_1'$ to $G_2'$ ($G_1'$=dynamic shear modulus at $-40°$ C.; and $G_2'$ = dynamic shear modulus at $100°$ C.) of up to 1.5, and a density of up to 2.0 g/cm$^3$, and the receiving portion being shaped from a thermoplastic elastomer having a hardness of 5 to 40.

BRIEF DESCRIPTION OF THE DRAWINGS

FIG. 1 is a partial cross sectional view of a turntable according to one embodiment of the present invention, as taken along line A—A' of FIG. 2;

FIG. 2 is a partial perspective view of the turntable of FIG. 1;

DETAILED DESCRIPTION OF THE INVENTION

Figure 3:
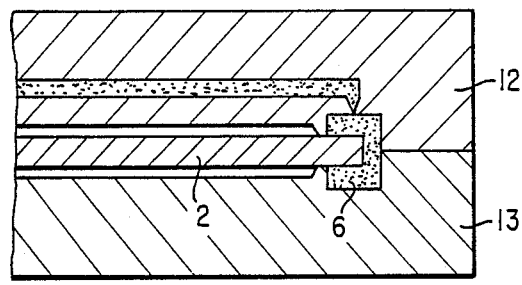
FIG. 3 is a partial cross sectional view of a mold assembly for injection molding receiving portions on the substrate of the turntable.

The substrate of the turntable of the present invention is formed of a thermoplastic composite resin having the following characteristics:

(1) a dynamic shear modulus, $G'$, of at least $1.5 \times 10^{10}$ dyne/cm$^2$ as measured at a temperature in the range of $-40°$ C. to $100°$ C.;

(2) the ratio of $G_1'$ to $G_2'$ of up to 1.5, $G_1'$ being the dynamic shear modulus at $-40°$ C. and $G_2'$ being the dynamic shear modulus at $100°$ C.; and (3) a density of up to 2.0 g/cm$^3$.

A thermoplastic composite resin whose $G'$ is less than $1.5 \times 10^{10}$ dyne/cm$^2$ is not suitable because it does not have sufficient rigidity to be used as the substrate of a turntable. A thermoplastic composite resin that has a $G_1'/G_2'$ ratio of more than 1.5 is also unsuitable as a turntable substrate, even though it has a $G'$ value of at least $1.5 \times 10^{10}$ dyne/cm$^2$, since it will experience temperature-dependent changes in its characteristics.

The thermoplastic composite resin of which the turntable substrate is made preferably has a dynamic shear modulus, $G'$, of at least $1.8 \times 10^{10}$ dyne/cm$^2$, more preferably at least $2.0 \times 10^{10}$ dyne/cm$^2$, over the temperature range of $-40°$ C. to $100°$ C. The ratio of $G_1'$ to $G_2'$ of the resin is preferably up to 1.3, more preferably up to 1.2. The density of the resin is preferably in the range of 1.0 to 1.8 g/cm$^3$, more preferably in the range of 1.2 to 1.7 g/cm$^3$.

Thermoplastic composite resins that satisfy the aforementioned characteristics (1) to (3) can be prepared by blending non-crystalline thermoplastic resins such as polycarbonate, styrene-modified polycarbonate, polysulfone or polyether ketone, preferably polycarbonate or styrene-modified polycarbonate, that have glass transition points of at least $100°$ C., preferably at least $120°$ C., with reinforcing fibers such as carbon fibers, silicon carbide fibers, glass fibers or boron fibers, preferably glass fibers, with the reinforcing fibers being incorporated in amounts ranging from 19 vol % to 70 vol % of the sum of the non-crystalline thermoplastic resins and the reinforcing fibers. Preferably, 10 the reinforcing fibers are incorporated in amounts of from 22 vol % to 50 vol % of the thermoplastic composite resin. A particularly preferably thermoplastic composite resin is such that it incorporates from 25 vol % to 50 vol % of glass fibers having an average diameter of up to 9 μm.

The non-crystalline thermoplastic resin and the reinforcing fibers are mixed in a molten state in a kneader such as a uniaxial or biaxial extruder and the extrudate is cut into pellets, which are injection-molded to form a disk-shaped substrate.

The thermoplastic composite resin that satisfies the characteristics (1) and (2) concerning the dynamic shear modulus and the characteristic (3) relating to the density has the advantages that it displays a high specific rigidity over a broad temperature range of from a low temperature to a high temperature of at least 100° C. and that its specific rigidity experiences very small changes with temperature. In addition, this thermoplastic composite resin has the high degree of surface flatness and dimensional precision that is necessary for use as the substrate of a turntable.

So long as it satisfies the characteristics (1) to (3), the thermoplastic composite resin may be modified by incorporating a suitable additive such as an inorganic filler (e.g., calcium carbonate, talc, mica or clay) or a pigment (e.g., titanium white, zinc oxide or carbon black). When injection-molding a disk-shaped substrate from the thermoplastic composite resin, preferred results are attained by using a molding machine having a high clamping pressure and by employing high molding temperature. The injection pressure is selected at a value in the range of 1,000 to 2,000 kg/cm$^2$, preferably in the range of 1,500 to 2,000 kg/cm$^2$. The mold temperature is selected at an appropriate value that suits the specific conditions.

After a disk-shaped substrate is shaped from the thermoplastic composite resin described above, a receiving portion is formed from a thermoplastic elastomer on top of the substrate as an integral part thereof. The thermoplastic elastomer which forms the receiving portion of the turntable of the present invention has a hardness of 5 to 40, preferably 10 to 30, as measured by the procedures specified in JIS K 6301, "Spring-type Hardness Test". Many types of thermoplastic elastomers are available and they include copolymer types such as those based on polystyrenes, polyolefins and polyesters, and composite types which have incorporated rubber in thermoplastic resins. Thermoplastic elastomers selected from these known types and those which have a hardness of 5 to 40 are used in the present invention. Particularly preferred thermoplastic elastomers are those which have as one component a hydrogenated derivative of block copolymer of the general formula A—(-B—A)$_n$ (wherein A is a polymer block of a monovinyl substituted aromatic hydrocarbon such as styrene; B is an elastomeric polymer block of a conjugated diene; n is an integer of 1 to 5) and which have a hardness of 5 to 40.

An example of the specific construction of a turntable for a video disk is shown in FIGS. 1 and 2 in which the turntable is generally indicated by 1. As shown therein, the turntable 1 basically comprises a disk-shaped substrate 2 and receiving portions 6 and 7. The substrate 2 has a plurality of small through-holes 3 formed on its circumference and a groove 4 formed concentrically around its center. A plurality of small through-holes 5 are also formed in the bottom of the groove 4. The small throughholes 3 and 5 serve to ensure strong adhesion between the substrate and each of the receiving portions 6 and 7 which are formed of a thermoplastic elastomer. The substrate 2 has a hole 8 through which the rotating shaft of the video disk player is to be inserted. The substrate 2 also has a recessed central portion with holes 9 into which a fastening device is to be inserted for securing the turntable to the player. Receiving portions 6 and 7 are formed of a thermoplastic elastomer on the top of the substrate 2 at selected positions in such a way that they project from the substrate 2.

The receiving portions 6 and 7 are generally formed 10 in a continuous annular form but, if desired, each of them may be formed of discrete receiving portions spaced in a ring form. Alternatively, projecting spots may be spaced on the substrate 2. In the embodiment shown in FIGS. 1 and 2, the substrate has two continuous annular receiving portions 6 and 7 formed on its outer and inner circumferences, respectively, with circular projections 10 being formed in the space between these receiving portions.

In order to ensure an increased damping effect for the turntable, it is preferred that a coating of thermoplastic elastomer is formed on both the outer and inner circumferences of the substrate 2.

By employing a suitable forming method such as injection molding or compression molding, the receiving portion may be formed along the outer circumference, inner circumference or at some other selected position of the preformed substrate 2 placed in a mold cavity. For instance, the substrate 2 is placed in the mold cavity defined by injection molds 12 and 13 as shown in FIG. 3 and the receiving portions 6 and 7 are injection molded from a thermoplastic elastomer in such a way that they project from the substrate 2.

In order to ensure that the receiving portions 6 and 7 are firmly secured to the substrate 2 with high dimensional precision, the substrate 2 must be set accurately in the mold cavity while it is firmly fixed and retained in the latter. To this end, a uniform pressure must be exerted on the entire portion of the parting surfaces of the molds and the clamping force must be adjusted to an appropriate value so that the pressure exerted will not produce any strain that would cause adverse effects on the dimensional precision of the surface of the substrate 2. To state this more specifically, the injection molds are set in such a way that their inner surfaces will exert on the substrate a pressure ranging from 300 to 800 kg/cm$^2$, preferably from 400 to 500 kg/cm$^2$.

If a double injection machine is used, successive formation of the substrate and receiving portions may be accomplished by performing injection molding in the same mold assembly.

Figure 4:
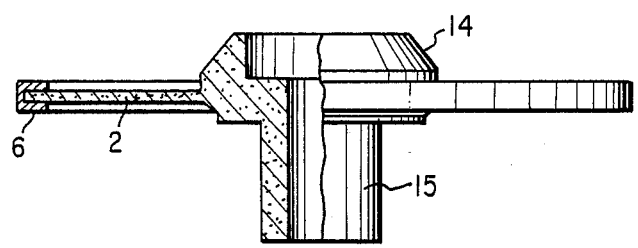
FIG. 4 is a cutaway view of a turntable according to another embodiment of the present invention which is intended to be used with an audio compact disk.

FIG. 4 shows a turntable for mounting an audio compact disk. The turntable comprises a disk-shaped substrate 2 and. receiving portion 6 that is formed along its outer circumference. The substrate 2 has an annular rib 14 on the top of its central portion. The rib 14 is bevelled along its peripheral edge and serves as a centering member for the compact disk. The substrate is also provided with a boss 15 on the underside of its central portion so that it engages the motor shaft on the compact disk player.

The turntable thus prepared in accordance with the present invention will experience a reduced amount of warpage, is assured of a good dimensional precision in its surface, and is lightweight. Because of these features, the turntable is highly suitable for use in video and audio apparatus such as a video disk player and a compact disk player. The turntable of the present invention also has good damping properties and therefore is most suitable for use with a video disk of the VHD format in connection with which there is a strong need to achieve improvements in damping effects.

The dynamic shear modulus, G', of the thermoplastic composite resin of which the substrate of the turntable of the present invention is made is measured by the following methods.

Measurement of dynamic shear modulus G'

The dynamic shear modulus, $G'$, is measured in accordance with the standard test method for dynamic mechanical properties of plastics by means of a torsional pendulum as described in ASTM D 2236-81, except that the forced torsional vibration method is employed under constant strain ($\leq 1.0\%$) and constant frequency (11 Hz) conditions. The testing apparatus usually employed is one having a forced torsional vibration mode such as a mechanical spectrometer Model 605M or 705M produced by Rheometrics Inc., U.S.A. Depending on the shape and size of the test specimen used, the forced tensile vibration method may be employed under constant strain ($\leq 1.0\%$) and constant frequency (11 Hz) conditions, provided that one third of the dynamic elastic tensile modulus, $E'$, determined by this method is used as the equivalent dynamic shear modulus $G'$. The forced tensile vibration method is usually implemented with a testing apparatus having a forced tensile vibration mode such as a Rheopipron Model II or III of Toyo Baldwin Co., Ltd., Japan, or a high-frequency viscoelastic spectrometer Model VES-HC produced by Iwamoto Seisakusho, K.K., Japan. Other usable methods are the forced compressive vibration method and the forced bending vibration method and in these methods, too, one third of the dynamic elastic modulus determined is used as the equivalent dynamic shear modulus $G'$.

Measurement of $G'$ is conducted over a temperature range of from $-40°$ C. to $100°$ C., with the speed of temperature elevation being set in such a manner that the temperature of the test specimen is at equilibrium. The temperature of the test specimen may be elevated stepwise or continuously (i.e., linearly). Usually, temperature elevation may be effected in increments of $2°$ to $5°$ C. with retension times of 3 to 5 minutes, or alternatively, it may be continuously effected at a rate of $1°$ to $2°$ C./min. After $G'$ measurements have been conducted in this way, the values at $-40°$ C. and $100°$ C. are used as $G_1'$ and $G_2'$, respectively.

Cylindrical or rectangular specimens are cut from the shaped article. While the size of the test specimens is not limited to any particular value, they should be as large as possible in order to provide ease of measurement. The size parameters to be measured are diameter and length if the specimens are cylindrical, and width, thickness and length if the specimens are rectangular.

The clamp and other components of the testing apparatus should be so selected that they are appropriate for the specific shape and size of a specimen. For example, specimens that are 12.7 mm in width, 0.5 to 6.4 mm in thickness and 40 to 63.5 mm in length are suitable for the standard clamp for causing torsional vibrations on a mechanical spectrometer. Smaller specimens are applicable if special clamps are employed. Specimens that are 2 mm in width, 1 mm in thickness and 1.5 mm in length (all being maximum sizes) are suitable for the standard clamp for causing tensile vibrations on a high-frequency viscoelastic spectrometer, and specimens that are 10 mm in width, 1 mm in thickness and 15 mm in length (all being maximum sizes) are suitable for the standard clamp for causing compressive vibrations on the same type of apparatus.

All test specimens cut from the shaped article are conditioned at $23 \pm 2°$ C. and $50 \pm 5\%$ relative humidity for at least 40 hours.

After conditioning, the specimens are immediately subjected to measurements so that they will not undergo any thermal hysteresis other than what is applied during their molding.

The following example is provided for the purpose of further illustrating the present invention but is in no way intended to limit the same.

EXAMPLE

A modified polycarbonate was prepared by styrene impregnation polymerization. This polymer had a glass transition point of $149°$ C. and a styrene content of 5 wt %. A mixture of 65 vol % of this polymer with 35 vol % of glass fibers (average diameter: 8 $\mu$m) was kneaded in a uniaxial extruder and the extrudate was cut into pellets. The pellets were charged into a precision injection molding machine having a clamping pressure of 350 tons and molded at a cylinder temperature of $320°$ C., at a mold temperature of $100°$ C. and at an injection pressure of $1,800$ kg/cm$^2$ so as to produce an annular shaped article that measured 260 mm in diameter and 2 mm in thickness and which had a central hollow portion with a diameter of about 70 mm. This article had a density of 1.60 g/cm$^3$.

Test specimens that were 63.5 mm in length, 12.7 mm in width and 2 mm in thickness were cut out from the shaped article and conditioned at $23 \pm 2°$ C. and $50 \pm 5\%$ relative humidity for 48 hours. Thereafter, the dynamic shear moduli of the specimens were measured at a frequency of 11 Hz with a mechanical spectrometer of Rheometrics, Inc., U.S.A.

The results were as follows: $G_1'$ (at $-40°$ C.)$=2.2 \times 10^{10}$ dyne/cm$^2$; $G_2'$ (at $100°$ C.)$=2.0 \times 10^{10}$ dyne/cm$^2$; and $G_1'G_2'=1.1$.

The substrate prepared above was set in a mold assembly and a thermoplastic elastomer having a hardness of 20 was injection-molded to form a shaped article having receiving portions along the outer and inner circumferences of the substrate as shown in FIG. 1. The thermoplastic elastomer was a blend of hydrogenated derivatives of block copolymers of the formula A—(-B—A)$_n$ (wherein A is a polymer block of styrene; B is an elastomeric polymer block of butadiene; and n is an integer of 1 to 5), non-aromatic mineral oil, and polypropylene.

The so formed shaped article was used as a turntable for a video disk player of the VHD format and its performance was formed to be excellent because of its short access time and high damping effects.

While the invention has been described in detail and with reference to specific embodiments thereof, it will be apparent to one skilled in the art that various changes and modifications can be made therein without departing from the spirit and scope thereof.

What is claimed is:

1. A turntable for mounting a recording medium in a disk form which comprises a substrate in a disk form and a receiving portion projecting from the top of said substrate, said substrate and said receiving portion being formed by injection-molding, said substrate being shaped from a thermoplastic composite resin, said resin comprising (a) a non-crystalline thermoplastic resin having a glass transition point of at least $100°$ C. and (b) reinforcing fibers in said thermoplastic resin in an amount from 19 to 70 vol. % relative to the sum of said resin and said fibers, wherein said resin has a dynamic shear modulus, $G'$, of at least $1.5 \times 10^{10}$ dyne/cm$^2$ as measured at a frequency of 11 Hz over the temperature range of −40° C. to 100° C., the ratio of dynamic shear modulus at −40° C., $G_1'$ to dynamic shear modulus at 100° C., $G_2'$ of up to 1.5, and a density of up to 2.0 g/cm$^3$, and said receiving portion being shaped from a thermoplastic elastomer having a hardness of 5 to 40.

2. A turntable as claimed in claim 1, wherein said thermoplastic composite resin has a $G'$ value of at least $1.8 \times 10^{10}$ dyne/cm$^2$, a $G_1'/G_2'$ value of up to 1.3, and a density of 1.0 to 1.8 g/cm$^3$.

3. A turntable as claimed in claim 1, wherein said thermoplastic composite resin has a $G'$ value of at least $2.0 \times 10^{10}$ dyne/cm$^2$, a $G_1'/G_2'$ value of up to 1.2, and a density of 1.2 to 1.7 g/cm$^3$.

4. A turntable as claimed in claim 1, wherein the reinforcing fibers are glass fibers.

5. A turntable as claimed in claim 4, wherein the glass fibers have an average diameter of up to 9 μm.

6. A turntable as claimed in claim 4, wherein the reinforcing fibers are incorporated in an amount of 22 to 50 vol % of the sum of the non-crystalline thermoplastic resin and the reinforcing fibers.

7. A turntable as claimed in claim 6, wherein the glass fibers are incorporated in an amount of 22 to 50 vol % of the sum of the non-crystalline thermoplastic resin and the glass fibers.

8. A turntable as claimed in claim 1, wherein said non-crystalline thermoplastic resin is selected from a polycarbonate, a styrene-modified polycarbonate, a polysulfone or a polyether ketone.

9. A turntable as claimed in claim 8, wherein said non-crystalline thermoplastic resin is a polycarbonate or a styrene-modified polycarbonate.

10. A turntable as claimed in claim 1, wherein the disk-shaped substrate is first formed by injection molding, then placed in a different mold assembly, followed by injection molding of the thermoplastic elastomer to form the receiving portion.

11. A turntable as claimed in claim 1 that is produced by shaping with a double injection machine that performs successive formation of the disk-shaped substrate and the receiving portion in the same mold assembly.

* * * * *